United States Patent
Kim et al.

(10) Patent No.: US 9,497,036 B2
(45) Date of Patent: Nov. 15, 2016

(54) METHOD AND APPARATUS FOR PROVIDING DEVICE WITH REMOTE APPLICATION IN HOME NETWORK

(75) Inventors: Kwang-hyuk Kim, Suwon-si (KR);
Young-soo Kang, Seoul (KR);
Jung-shin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 579 days.

(21) Appl. No.: 12/646,051

(22) Filed: Dec. 23, 2009

(65) Prior Publication Data

US 2010/0169413 A1    Jul. 1, 2010

(30) Foreign Application Priority Data

Dec. 26, 2008 (KR) .................. 10-2008-0134955

(51) Int. Cl.
*G06F 15/16* (2006.01)
*H04L 12/28* (2006.01)
*H04L 29/08* (2006.01)

(52) U.S. Cl.
CPC ....... *H04L 12/2812* (2013.01); *H04L 12/2818* (2013.01); *H04L 67/10* (2013.01); *H04L 67/125* (2013.01); *H04L 2012/2849* (2013.01)

(58) Field of Classification Search
CPC ........... H04L 12/2805; H04L 12/2807; H04L 12/2816; H04L 12/2823; H04L 12/2838; H04L 12/281; H04L 12/2812; H04L 12/2814; H04L 2012/2848

USPC ........................................................ 709/203
See application file for complete search history.

(56) References Cited

U.S. PATENT DOCUMENTS

| | | | |
|---|---|---|---|
| 7,792,920 B2 * | 9/2010 | Istvan et al. | 709/217 |
| 2002/0029256 A1 * | 3/2002 | Zintel et al. | 709/218 |
| 2003/0037104 A1 * | 2/2003 | Okamura | 709/203 |
| 2003/0093769 A1 * | 5/2003 | Kumar | 717/108 |
| 2003/0126239 A1 * | 7/2003 | Hwang | H04L 12/2803 709/220 |

(Continued)

FOREIGN PATENT DOCUMENTS

| | | |
|---|---|---|
| EP | 1770961 A1 | 4/2007 |
| JP | 200578339 A | 3/2005 |
| JP | 2006-99380 A | 4/2006 |

OTHER PUBLICATIONS

Communication, dated Apr. 9, 2013, issued by the Japanese Patent Office in counterpart Japanese Application No. 2009-295525.

(Continued)

*Primary Examiner* — Ario Etienne
*Assistant Examiner* — Blake Rubin
(74) *Attorney, Agent, or Firm* — Sughrue Mion, PLLC

(57) ABSTRACT

Provided is a method and apparatus for providing a client with an application received through a data broadcast channel as a type of content of a content directory service (CDS) or a Universal Plug and Play (UPnP) service newly defined to provide applications by a server.

8 Claims, 8 Drawing Sheets

(56) References Cited

U.S. PATENT DOCUMENTS

| | | | |
|---|---|---|---|
| 2003/0229900 A1* | 12/2003 | Reisman | G06F 17/30873 725/87 |
| 2004/0081201 A1* | 4/2004 | Simonnet | H04L 41/08 370/469 |
| 2005/0022015 A1* | 1/2005 | Van Den Heuvel et al. | 713/201 |
| 2005/0027740 A1* | 2/2005 | Moritani et al. | 707/104.1 |
| 2005/0081218 A1* | 4/2005 | Acott et al. | 719/328 |
| 2005/0135341 A1* | 6/2005 | Kim | 370/352 |
| 2005/0144224 A1* | 6/2005 | Togashi et al. | 709/203 |
| 2005/0267935 A1* | 12/2005 | Gandhi | H04L 29/1232 709/203 |
| 2006/0031530 A1* | 2/2006 | Iizuka | H04L 12/2803 709/227 |
| 2006/0164550 A1* | 7/2006 | Yoshimoto et al. | 348/571 |
| 2006/0168126 A1* | 7/2006 | Costa-Requena et al. | 709/219 |
| 2006/0168354 A1* | 7/2006 | Hutter | H04L 12/2805 709/250 |
| 2007/0074163 A1* | 3/2007 | Van Gassel et al. | 717/120 |
| 2007/0112909 A1* | 5/2007 | Miyamoto | H04L 12/281 709/200 |
| 2007/0143488 A1* | 6/2007 | Pantalone | H04L 63/08 709/230 |
| 2007/0168046 A1* | 7/2007 | Misawa et al. | 700/1 |
| 2007/0168051 A1* | 7/2007 | Bronnenberg | H04N 21/4332 700/20 |
| 2008/0050096 A1* | 2/2008 | Ryu | 386/99 |
| 2008/0112405 A1* | 5/2008 | Cholas et al. | 370/389 |
| 2008/0141323 A1* | 6/2008 | Munetsugu et al. | 725/115 |
| 2008/0183852 A1* | 7/2008 | Pramer et al. | 709/223 |
| 2008/0209491 A1* | 8/2008 | Hasek | 725/114 |
| 2008/0263173 A1* | 10/2008 | Weber | H04L 12/2805 709/217 |
| 2009/0100147 A1* | 4/2009 | Igarashi | 709/218 |
| 2009/0177971 A1* | 7/2009 | Kim et al. | 715/739 |
| 2009/0180398 A1* | 7/2009 | Lejeune | 370/254 |
| 2009/0210525 A1* | 8/2009 | Huetter et al. | 709/224 |
| 2009/0287794 A1* | 11/2009 | Saaranen et al. | 709/219 |
| 2010/0064324 A1* | 3/2010 | Jenkin et al. | 725/59 |
| 2010/0118663 A1* | 5/2010 | Kim | H04H 20/63 369/7 |
| 2010/0269146 A1* | 10/2010 | Britt | 725/110 |
| 2011/0029653 A1* | 2/2011 | Stein | H04L 12/2801 709/223 |

OTHER PUBLICATIONS

Communication dated Apr. 9, 2014 issued by the Japanese Patent Office in counterpart Japanese Patent Application No. 2009-295525.
Communication dated Jun. 1, 2015 issued by the Japanese Patent Office in counterpart Japanese Patent Application No. 2009-295525.

* cited by examiner

FIG. 4B

```
:
<serviceList>
<service>
<serviceType>urn.schemas-upnporg:
service:ConnectionManager:1</serviceType>
<serviceId>urn:upnp-org:serviceId:ConnectionManager</serviceId>
<SCPDURL>ConnectionManager.xml</SCPDURL>
<eventSubURL>ConnectionManager/Event</eventSubURL>
<controlURL>ConnectionManager/Control</controlURL>
</service>
<service>
<serviceType>urn.schemas-upnporg:
service:ApplicationService:2</serviceType>
<serviceId>urn:upnp-org:serviceId:ApplicationService</serviceId>
<SCPDURL>ApplicationService.xml</SDPDURL>
<eventSubURL>ApplicationService/Event</eventSubURL>
<controlURL>ApplicationService/Control</controlURL>
</service>
</serviceList>
:
```

FIG. 5

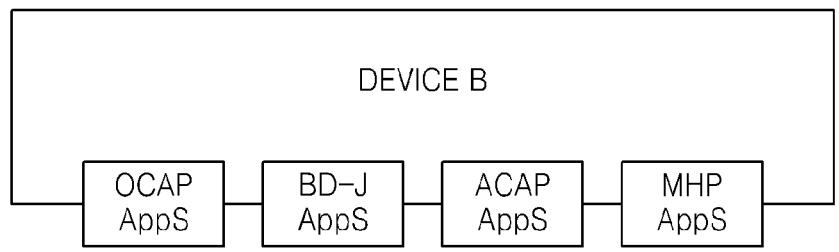

FIG. 8A

```
<xml version="1.0"?>
<root xmlns="urn:schemas-upnp-org:device-1-0">
    <specVersion> <major>1</major> <minor>0</minor> </specVersion>
    <device>
      <serviceList>
        <service>
            <serviceType>urn:schemas-upnp-org:service:serviceType:I</serviceType>
            <serviceId>urn:upnp-org:serviceId:serviceID:I</serviceId>
            <SCPDURL>URL to service description</SCPDURL>
            <controlURL>URL for control </controlURL>
            <eventSubURL>URL for enenting </eventSubURL>

<ocap:X_applicationSupported>YES</ocap:X_applicationSupported>

</service>
        Declaration for other services defined by a UPnP Forum (if any) go here
        Declaration for other services added by UPnP vender (if any) go here
      </serviceList>
      <deviceList>
        Declaration of embedded devices defined by a UPnP Forum (if any) go here
        Declaration of embedded devices by UPnP vender (if any) go here
      </deviceList>
      <presentationURL>URL for presentation</presentationURL>
    </device>
</root>
```

FIG. 8B

```
<scpd xmlns="urn:schemas-upnp-org:service-1-0">
<ocap:X_applicationSupported>YES</ocap:X_applicationSupported>
<actionLIst>
    <action> <name> actionName </name>
        <argumentList>
            <argument>
                <name>formalParameterName</name>
                <direction>in or out</direction>
                <relatedStateVariable>stateVariableName</relatedStateVariable>
            </argument>
        </argumentList>
    <ction>
</actionLIst>
<serviceStateTable>
    <stateVariable sendEvents="yes">
        <name>variableName</name>
        <dataType>variable data type</dataType>
        <defaultValue>default value</defaultValue>
        <allowedValueList>
            <allowedValue>enumerated value</allowedValue>
        </allowedValueList>
    </stateVariable>
    </serviceStateTable>
</scpd>
```

FIG. 8C

```xml
<xml version="1.0"?>
<root xmlns="urn:schemas-upnp-org:device-1-0">
    <specVersion> <major>1</major> <minor>0</minor> </specVersion>
    <device>

<ocap:X_applicationSupported>YES</ocap:X_applicationSupported>

<serviceList>
            <service>
                <serviceType>urn:schemas-upnp-org:service:serviceType:l</serviceType>
                <serviceId>urn:upnp-org:serviceId:serviceID:l</serviceId>
                <SCPDURL>URL to service description</SCPDURL>
                <controlURL>URL for control </controlURL>
                <eventSubURL>URL for enenting </eventSubURL>
            </service>
            Declaration for other services defined by a UPnP Forum (if any) go here
            Declaration for other services added by UPnP vender (if any) go here
        </serviceList>
        <deviceList>
            Declaration of embedded devices defined by a UPnP Forum (if any) go here
            Declaration of embedded devices by UPnP vender (if any) go here
        </deviceList>
        <presentationURL>URL for presentation</presentationURL>
    </device>
</root>
```

METHOD AND APPARATUS FOR PROVIDING DEVICE WITH REMOTE APPLICATION IN HOME NETWORK

CROSS-REFERENCE TO RELATED PATENT APPLICATION

This application claims priority from Korean Patent Application No. 10-2008-0134955, filed on Dec. 26, 2008, in the Korean Intellectual Property Office, the disclosure of which is incorporated herein in its entirety by reference.

BACKGROUND OF THE INVENTION

1. Field of the Invention

Apparatuses and methods consistent with the -inventive concept_relate to a home network, and more particularly, using an application stored in a server by a client in a home network.

2. Description of the Related Art

Home network services such as a Content Directory Service (CDS), an Audio Video Transport Service (AVTS), and a Rendering Control Service (RCS) have emerged based on Universal Plug and Play (UPnP) which is home network middleware. By combining data broadcasting and home network technology, a data broadcasting application can be recorded by a digital video recorder (DVR) and a recorded broadcast stream can be provided to another device in a home network.

FIG. 1 is a diagram for explaining a method in which a device (device A) uses an application stored in another device (device B) in a home network according to the prior art.

A UPnP standardized service, such as a CDS, provides general contents like general AV, a moving picture, or a music file, but does not provide a method of using an application. Thus, in order for a device (a client) having installed therein middleware supporting Open Cable Application Platform (OCAP), Multimedia Home Platform (MHP), or Blu-ray Disc Java (BD-J), i.e., having an environment capable of driving an application, to use an application of a remote device (a server), the device has to request a stream including the application and execute the application with reference to an application information table (AIT) included in the stream.

Therefore, as shown in FIG. 1, in order to provide an application as a component included in a broadcast stream, the client (device A) also has to receive an AV stream from the server (device B) even when it desires to drive only the application, irrespective of the AV stream. If the server separately stores the AV stream and the application, it may be difficult to provide the AV stream and the application together.

SUMMARY OF THE INVENTION

One or more exemplary embodiments provide a method and apparatus for allowing a device (e.g., a client) to use a remote application stored in another device (e.g., a server) in a home network.

According to an aspect of an exemplary embodiment, there is provided a method of providing an application by a server in a home network, the method including transmitting at least one document including information for remotely using the application to a client, receiving a control request for the application from the client, and controlling the application according to the control request.

The document may include at least one of a UPnP device description and a UPnP service description.

The document may indicate that a content directory service (CDS) of the server provides the application as a type of content.

The method may further include transmitting metadata of the application to the client in response to calling a browse( ) or search( ) action of the client.

The metadata may include at least one of an AIT for the application, position information of the AIT, an application management table (AMT) for the application, and position information of the AMT.

The metadata may include at least one of profile information of middleware to which the application is subordinate, attribute information of the middleware, and release version information of the middleware.

The document may include at least one of a UPnP device description indicating that the server provides a predetermined UPnP service defined to provide applications and a UPnP service description including information about actions for remotely using the application.

The document may include at least one of a UPnP device description indicating that the server provides a plurality of applications subordinate to a plurality of middleware as an independent UPnP service for each of the plurality of middleware and a UPnP service description including information about actions for remotely using the plurality of applications.

The server may operate as an OpenCable-Digital Media Server (OC-DMS) and the client may operate as an Open-Cable-Digital Media Player (OC-DMP).

According to another aspect of an exemplary embodiment, there is provided a computer-readable recording medium having recorded thereon a computer program for executing the method of providing an application by a server in a home network.

According to another aspect of an exemplary embodiment, there is provided an apparatus for providing an application of a server to a client in a home network, the apparatus including an information providing unit which transmits at least one document including information for remotely using the application to the client, a request receiving unit which receives a control request for the application from the client, and a control unit which controls the application according to the control request.

According to another aspect of an exemplary embodiment, there is provided a method of using an application of a server by a client in a home network, the method including searching for a server which holds the application in the home network, extracting information which controls the application from a Universal Plug and Play (UPnP) service description of the found server, and controlling the application by using the extracted information.

The searching for the server may include searching for devices which provide applications as a type of content in a CDS by using one of a UPnP device description and the UPnP service description and searching for a device which holds the application as a content item from among the devices which provide applications as the type of content by using a browse( ) or a search( ) action.

The searching for the server may include searching for a device which provides a predetermined UPnP service defined to provide applications by using a UPnP device description.

The controlling of the application may include generating a service module in a form of an object, which allows a local application installed in the client to control the application of the server, by using a UPnP service description for the predetermined UPnP service, and calling a corresponding action of the predetermined UPnP service when a request for the application of the server from the local application through the service module is received.

The server may operate as an OC-DMS and the client may operate as an OC-DMP.

According to another aspect of the present invention, there is provided a computer-readable recording medium having recorded thereon a computer program for executing the method of using an application of a server by a client in a home network.

According to another aspect of the present invention, there is provided a client apparatus which uses a remote application in a home network, the client apparatus including a searching unit which searches for a server which holds the application in the home network, an information extracting unit which extracts information for controlling the application from a UPnP service description of the server which holds the application, and a control unit which controls the application by using the extracted information.

The control unit may include: an object generating unit which generates a service module in a form of an object, which allows a local application installed in the client apparatus to control the application of the server, by using a UPnP service description for the predetermined UPnP service; and an action calling unit which calls a corresponding action of the predetermined UPnP service when a request for the application of the server from the local application through the service module is received.

BRIEF DESCRIPTION OF THE DRAWINGS

The above and other aspects will become more apparent by describing in detail exemplary embodiments with reference to the attached drawings in which:

FIGS. 4A and 4B illustrate a device description of a server which provides an application service according to an exemplary embodiment;

FIG. 5 is a conceptual diagram for explaining a method of providing an application service for each middleware by a server according to an exemplary embodiment;

FIGS. 8A to 8C illustrate documents indicating that a server has an application providing function according to an exemplary embodiment.

DETAILED DESCRIPTION OF EXEMPLARY EMBODIMENTS

Hereinafter, exemplary embodiments will be described in detail with reference to the accompanying drawings.

In the following description, in an exemplary home network, a device which provides an application will be referred to as a server and a device which uses a remote application will be referred to as a client.

Figure 1:
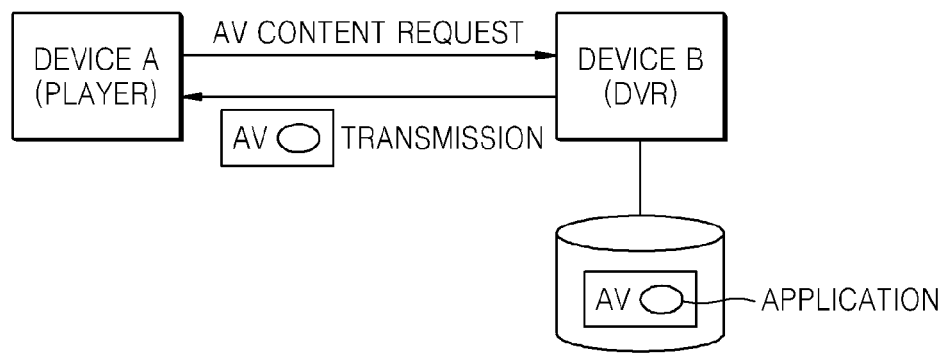
FIG. 1 is a diagram for explaining a method in which a device uses an application stored in another device in a home network according to the related art.
Figure 2:
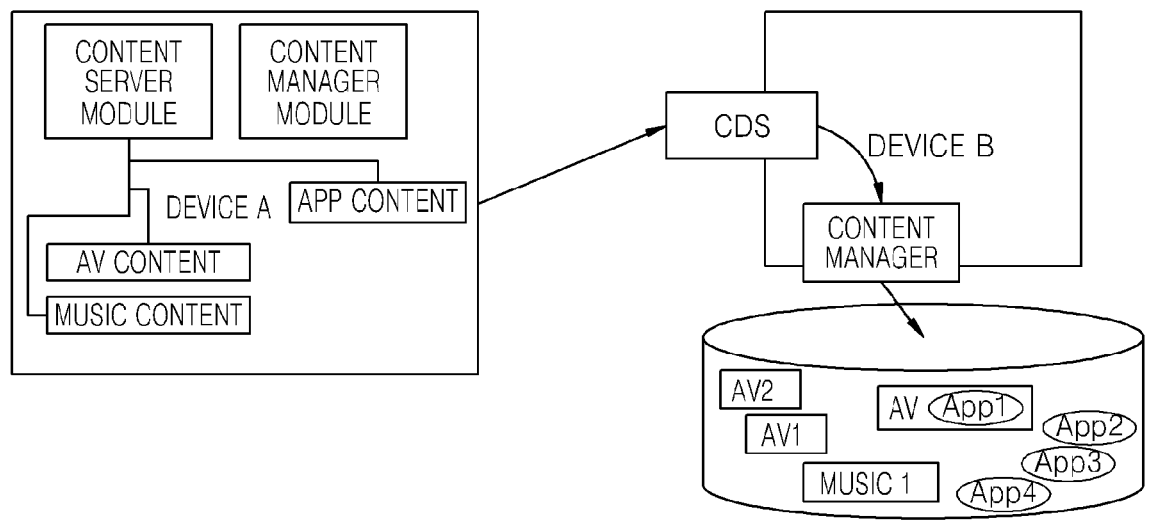
FIG. 2 is a conceptual diagram for explaining a method of providing an application as content of a CDS to a client by a server according to an exemplary embodiment.

FIG. 2 is a conceptual diagram for explaining a method of providing an application as content of a Content Directory Service (CDS) to a client by a server according to an exemplary embodiment.

As shown in FIG. 2, according to an exemplary embodiment of the present invention, a server (e.g., device B) provides an application as content of a UPnP CDS. That is, the server may register the application as its content and the client (e.g., device A) may obtain a list and metadata of applications by calling an action such as browse( ) search( ) or the like.

In a home network to which the OCAP standard is applied, a server and a client may operate as an OC-DMS and an OC-DMP, respectively. In this case, once the application is registered as content, ContentContainer of the client sets a type of the content as <application>. In this way, for local applications installed in the client, content types may be set as <application> and thus application contents may be searched. An application may also be searched based on a data broadcasting standard or a type of middleware, such as OCAP, Advanced Common Application Platform (ACAP), MHP, or BD-J. Moreover, for a specific standard, executable applications may be searched by using profile information and a release version of middleware of a client.

Since a local application of the client may determine whether a found remote application can be executed in the client with reference to metadata of the remote application, it is desirable to selectively request only an executable application.

The local application of the client may obtain abstract service information from the metadata of the remote application and request the remote application by using the abstract service information through a ServiceContext module.

The local application of the client may also request the remote application by using the metadata of the remote application through an application manager module. In response to a request for executing an application, the application manager module requests a server to provide the application with reference to metadata of the application, such as position information, an application information table (AIT), and an application management table (AMT). At this time, reference may be made to the position information of the application, attributes of the application, such as an ID of the application (e.g., App1, App2, App3, App4), author or provider information, and functions of the application, initial start state information of the application, parameter information for executing the application, and a caching method of the application, all of which are included in the metadata.

Figure 3:
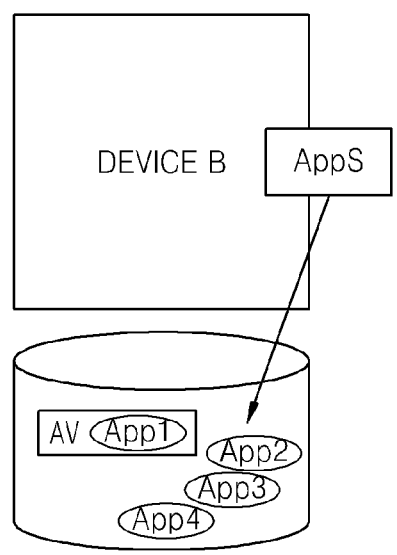
FIG. 3 is a conceptual diagram for explaining a method of providing an application as an independent service by a server according to an exemplary embodiment.

FIG. 3 is a conceptual diagram for explaining a method of providing an application as an independent service by a server according to an exemplary embodiment of the present invention.

As shown in FIG. 3, according to an exemplary embodiment, a server (e.g., device B) provides an application through a predetermined UPnP service ("AppS" in FIG. 3, which will hereinafter be referred to as an application service) defined separately for the purpose of providing the application, instead of providing the application as content of a particular service (e.g., a CDS). That is, the server provides the application in a service level like a CDS or an Audio Video Transport Service (AVTS).

Thus, the server provides a UPnP service description (which will hereinafter be referred to as a service description) for the application service to the client, and the service description includes information about actions for controlling the application. For example, in the service description, an action for searching for the application, an action for loading the application, and an action for loading a particular application from a third client may be defined.

If the client operates as an OC-DMP and the server operates an OC-DMS, the client generates a service module in the form of an object, which allows a local application installed in the client to use an application of the server, by referring to the service description. The local application of the client may also use an application service of the server by referring to metadata of a remote application through the application manager module. The local application may also obtain abstract service information from metadata of a remote application and then use a service of the remote application based on the abstract service information through a module having a presentation function, such as a ServiceContext module.

Figure 4A:
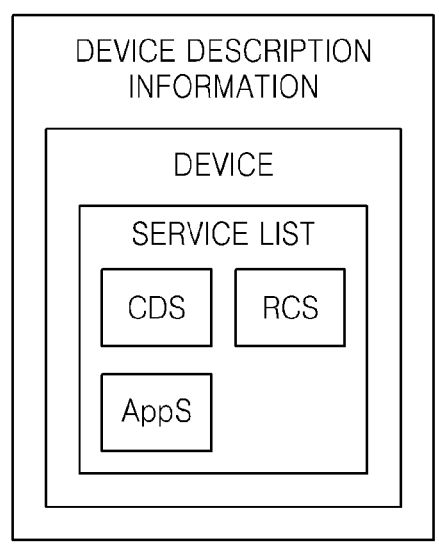

FIGS. 4A and 4B illustrate a UPnP device description (which will hereinafter be referred to as a device description) of a server which provides an application service according to an exemplary embodiment.

Referring to FIG. 4A, the device description of the server indicates that an application service AppS is provided together with a CDS and an RCS. More specifically, as shown in FIG. 4B, a service list of the device description of the server which provides the application service includes information associated with the application service, more specifically, a uniform resource locator (URL) of the service description, a URL for requesting a control action of the application, and a URL for monitoring an event.

FIG. 5 is a conceptual diagram for explaining a method of a server providing an application service for each middleware according to an exemplary embodiment of the present invention.

Although the server provides all applications thereof through a single application service in the exemplary embodiment shown in FIG. 3, the server can provide an independent application service for each middleware to which applications are subordinate in the exemplary embodiment of the present invention. For example, as shown in FIG. 5, the server (e.g., device B) may provide an OCAP application service which provides an application service being subordinate to OCAP, a BD-J application service which provides an application service being subordinate to BD-J, an ACAP application service which provides an application service being subordinate to ACP, and an MHP application service which provides an application service being subordinate to MHP, independently of one another.

In this case, the server (e.g., device B) may provide attributes of each middleware, profile information of each middleware, release version information of each middleware, and attribute information associated with an operating environment of each middleware through metadata.

Figure 6:
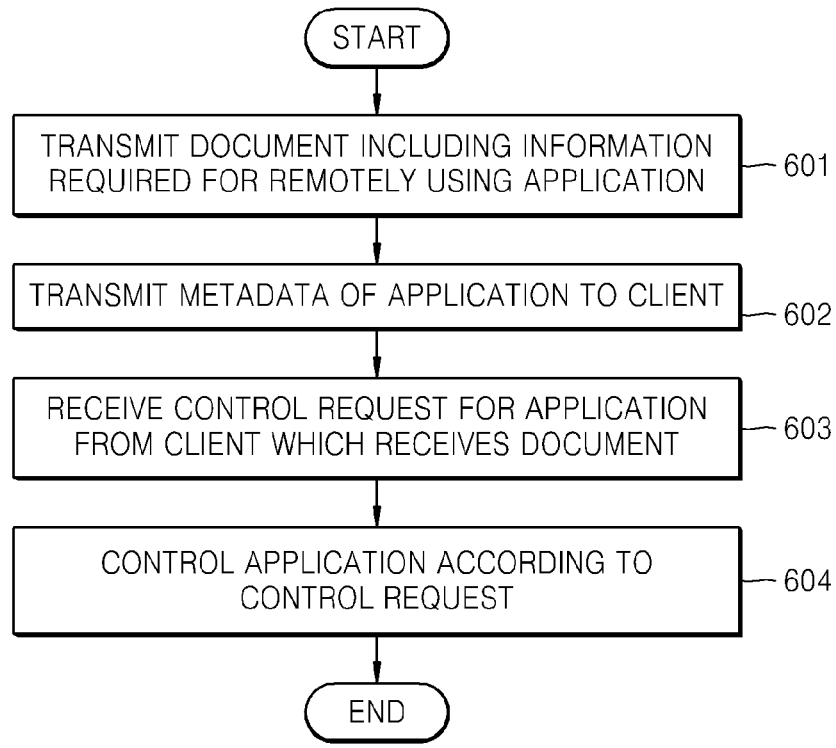
FIG. 6 is a flowchart illustrating a process of providing an application to a client by a server according to an exemplary embodiment.

FIG. 6 is a flowchart illustrating a process of providing an application to a client by a server according to an exemplary embodiment of the present invention.

In operation 601, a server transmits a document including information for remotely using an application of the server to a client. The information may include information requested in order for the client to ultimately load the application of the server. Thus, the information may include information indicating that the server provides the application as a type of content of a CDS or through an application service, and information about actions for controlling the application. The document may include at least one of a device description and a service description.

In operation 602, the server transmits metadata of the application to the client. If the server provides the application as content of a CDS, the metadata may be a response to a browse( ) or a search( ) call. If the server provides the application through an application server, an action for requesting the metadata may be defined in the application service, and the metadata may be a response to the action.

The metadata of the application is a concept including information associated with the application. For example, the information associated with the application may be profile information of middleware to which the application is subordinate, attribute information and release version information of middleware, position information of the application, attributes of the application (e.g., an ID of the application, author or provider information, and functions of the application), initial start state information of the application, parameter information for executing the application, and information about a caching method of the application, most of which are indicated in an AIT or AMT for the application. Thus, the metadata of the application may include at least one of an AIT for the application, position information of the application, an AMT for the application, and position information of the application.

In operation 603, the server receives a control request for the application from the client which receives the document.

In operation 604, the server controls the application according to the control request. For example, the server transmits the application to the client indicated in the control request.

Thus, according to the exemplary embodiment, in a home network, a device can efficiently search for and use an application of another device, irrespective of an audio/video (AV) stream.

Figure 7:
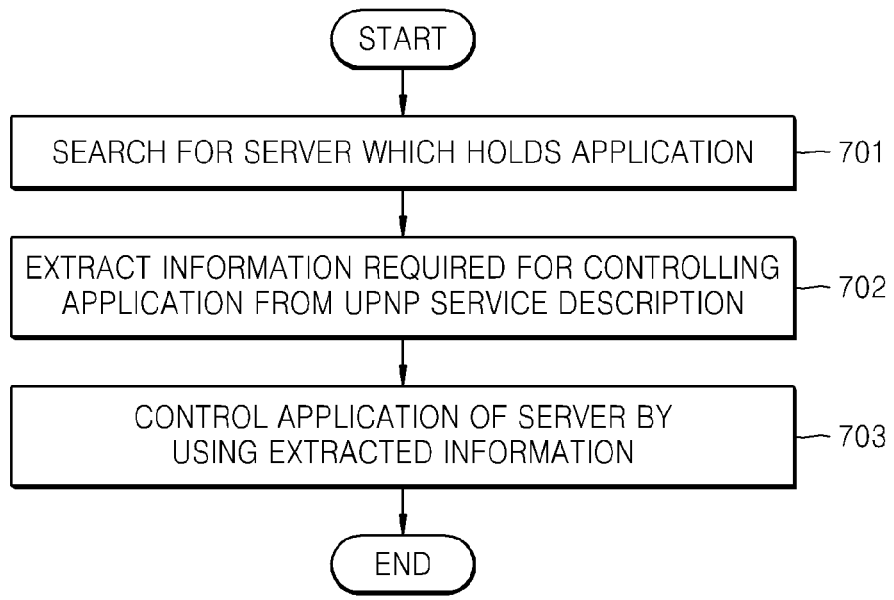
FIG. 7 is a flowchart illustrating a process of using an application of a server by a client according to an exemplary embodiment.

FIG. 7 is a flowchart illustrating a process of using an application of a server by a client according to an exemplary embodiment.

In operation 701, the client searches for a server which holds a particular (target) application. If the server provides an application as content of a CDS, the client first has to search for devices which provide applications as a type of content of a CDS. Information about a search result may be inserted into a device description or a service description. Next, the client has to search for a device which holds the target application as a content item from among the found devices. To this end, the browse( ) or search( ) action may be used.

If the server provides an application through an application service, the client first searches for devices which provide application services in the home network by referring to device descriptions. In a service list of a device description provided by a device which provides an application service, the application service is indicated, whereby the devices which provide the application services can be found by referring to the device descriptions of the devices. Once the devices which provide the application services are found, a search for a device having the target application, from among the found devices, is performed. To this end, a predetermined action defined for searching for an application in an application service may be used.

In operation 702, the client extracts information for controlling the target application from a service description. That is, the client extracts information about an action for controlling the target application.

In operation 703, the client controls the target application by using the extracted information. The client generates a service module in the form of an object, which allows a local application installed in the client to use an application of the server, by referring to the service description of the application service, and calls a corresponding action upon receiving a request for the application of the server from the local application through the service module.

According to an exemplary embodiment, the client may determine whether the client can execute the application by referring to metadata of the application, and then call a corresponding action if the client can execute the application.

FIGS. 8A to 8C illustrate documents indicating that a server supports an application providing function according to an exemplary embodiment.

As mentioned above, in order to remotely use an application of a server, the client first has to search for the server which provides the application as content of a CDS or in a service level. To this end, information (hereinafter be referred to as "support indicating information") indicating that the server supports the application providing function may be inserted into a device description or a service description.

The support indicating information is included in a service list of a device description in FIG. 8A, is included in a service description in FIG. 8B, and is inserted by using a separate attribute tag in a device description in FIG. 8C.

Figure 9:
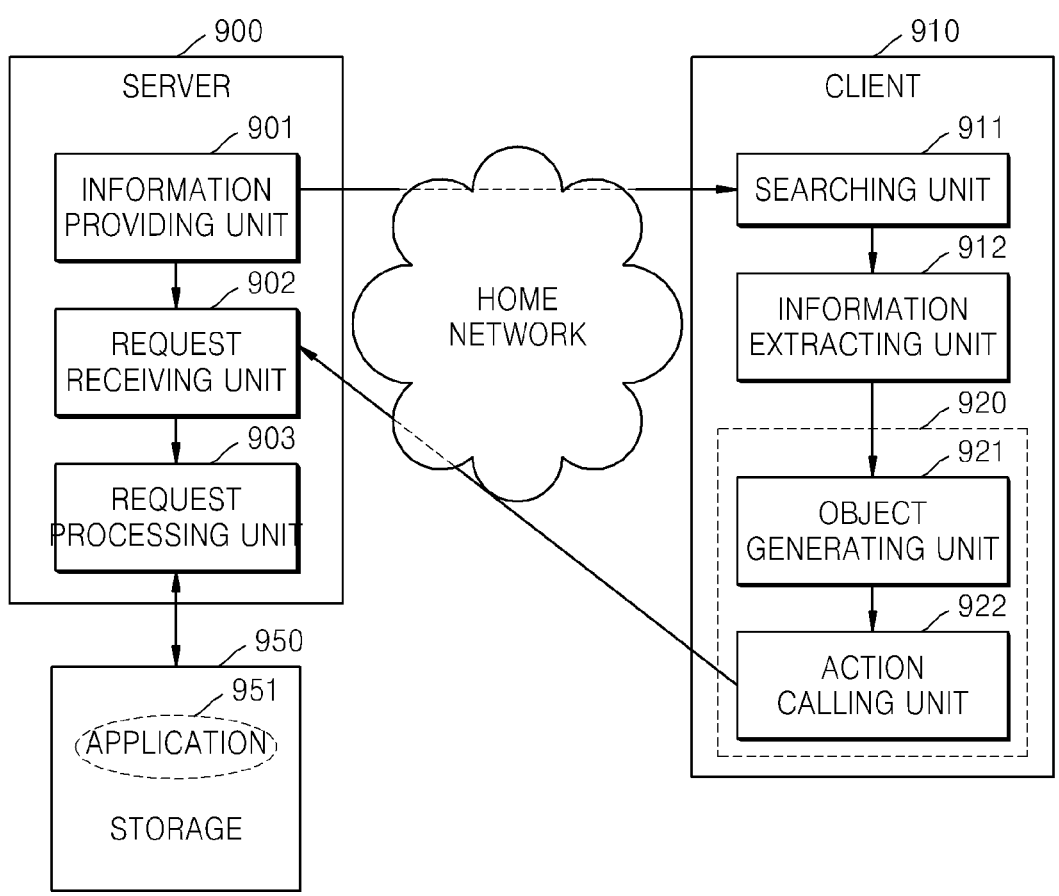
FIG. 9 illustrates structures of a server and a client according to an exemplary embodiment.

FIG. 9 illustrates structures of a server and a client according to an exemplary embodiment.

As shown in FIG. 9, a server 900 according to an exemplary embodiment includes an information providing unit 901, a request receiving unit 902, and a request processing unit 903.

The information providing unit 901 transmits a document including information for remotely using an application 951 stored in a local storage 950 to a client 910. The document may include at least one of a device description and a service description. The document includes support indicating information indicating that the server 900 provides the application 951 as a type of content of a CDS or through an application service which is a service newly defined in the present invention. Thus, the client 910 may recognize that the server 900 is a device supporting an application providing function in the home network.

If the server 900 supports an application service, the service description may include information about actions for remotely using the application 951 of the server 900.

As previously described with reference to FIG. 5, application services may be provided independently for each middleware. In this case, a service list of a device description of the server 900 may indicate that the server 900 provides applications being subordinate to middleware as a single service for each middleware.

The request receiving unit 902 transmits metadata of the application 951 to the client 910 in response to a browse( ) or search( ) call defined in a CDS of the client 910 or a predetermined action call of an application service newly defined in an exemplary embodiment. The metadata of the application 951 may include profile information of middleware to which the application 951 is subordinate, attribute information of the middleware, and release version information of the middleware. The metadata may also include an AIT or AMT for the application 951.

The request processing unit 903 controls the application at the request from the client 910. For example, the request processing unit 903 transmits the application 951 to the client 910 or another client (not shown).

The client 910 includes a searching unit 911, an information extracting unit 912, and a control unit 920.

The searching unit 911 searches for a server which holds the application 951 in the home network. More specifically, the searching unit 911 searches for devices which provide applications as a type of content of a CDS by referring to a device description or a service description, and finally finds out the server 900 which holds the target application 951 as a CDS content item from among the found devices by using a browse( ) or a search( ) call.

If the server 900 provides an application service, the searching unit 911 searches for devices which provide application services in the home network by referring to device descriptions. Next, the searching unit 911 calls a predetermined action provided in an application service, thereby finally finding out the server 900 which holds the target application 951.

The information extracting unit 912 extracts information for controlling the application 951 from the service description of the found server 900, such as a parameter used for a control message.

The control unit 920 controls the application 951 by using the information extracted by the information extracting unit 912.

The control unit 920 includes an object generating unit 921 and an action calling unit 922.

The object generating unit 921 generates a service module in the form of an object, which allows a local application installed in the client 910 to use the remote application 951, by referring to a service description for the application service of the server 900.

Upon receiving a request for the remote application 903 from the local application through the service module, the action calling unit 922 calls a corresponding action of the application service. As a result, the client 910 receives all or some of the application 951 and loads it in a memory, whereby the application 951 becomes available.

The exemplary embodiments can be embodied as a program that can be executed on a computer and can be implemented in a general-purpose digital computer executing the program using a computer-readable recording medium.

Examples of the computer readable recording medium include magnetic recording media such as a read-only memory (ROM), a random-access memory (RAM), floppy disks, and hard disks, and optical data storage devices such as CD-ROMs and digital versatile disks (DVDs).

While the exemplary embodiments have been particularly shown and described with reference to the embodiments thereof, it will be understood by those of ordinary skill in the art that various changes in form and details may be made therein without departing from the spirit and scope of the present invention as defined by the following claims.

What is claimed is:

1. A method of using an application of a server by a client in a home network, the method comprising:
   receiving, for each of a plurality of devices in the home network, a document comprising at least one of a UPnP device description and a UPnP service description, the UPnP device description or the UPnP service description comprising support indicating information which indicates that the each of the plurality of devices provides an application through a Content Directory Service (CDS) in which a type of content of an application is set differently from that of an audio/video (AV) stream or that the each of the plurality of devices provides an application through a Universal Plug and Play (UPnP) service defined for providing an application, wherein the UPnP service is independent of a service for providing an AV stream, searching for the server which holds the application in the home network;

extracting information required for controlling the application from the UPnP service description of the server which holds the application; and controlling the application by using the extracted information, wherein the searching for the server further comprises:

searching for devices which provide applications through the CDS from among the plurality of devices by referring to the UPnP device description or the UPnP service description, and searching for a device as the server which holds the application as a content item by using a browse( ) or search( ) action from among the searched devices; or searching for devices which provide applications through the UPnP service by referring to the UPnP device description or the UPnP service description, and searching for a device as the server which holds the application by calling a predetermined action provided in the UPnP service.

2. The method of claim 1, wherein the controlling the application comprises:

generating a service module in a form of an object, which allows a local application installed in the client to control the application of the server, based on a UPnP service description for the UPnP service; and calling a corresponding action of the UPnP service when a request for the application of the server from the local application through the service module is received.

3. The method of claim 1, wherein the server is an OpenCable-Digital Media Server (OC-DMS) and the client is an OpenCable-Digital Media Player (OC-DMP).

4. A non-transitory computer-readable recording medium having recorded thereon a computer program for executing the method of claim 1.

5. A client apparatus which uses a remote application in a home network, the client apparatus comprising:

a searching unit which receives, for each of a plurality of devices in the home network, a document comprising at least one of a UPnP device description and a UPnP service description, the UPnP device description or the UPnP service description comprising support indicating information which indicates that the each of the plurality of devices provides an application through a Content Directory Service (CDS) in which a type of content of an application is set differently from that of an audio/video (AV) stream or that the each of the plurality of devices provides an application through a Universal Plug and Play (UPnP) service defined for providing an application, wherein the UPnP service is independent of a service for providing an AV stream, and searches for the server which holds the application in the home network;

an information extracting unit which extracts information required for controlling the application from the UPnP service description of the server which holds the application; and a control unit which controls the application by using the extracted information, wherein the searching unit searches for devices which provide applications through the CDS from among the plurality of devices by referring to the UPnP device description or the UPnP service description, and searching for a device as the server which holds the application as a content item by using a browse( ) or search( ) action from among the searched devices; or searches for devices which provide applications through the UPnP service by referring to the UPnP device description or the UPnP service description, and searching for a device as the server which holds the application by calling a predetermined action provided in the UPnP service.

6. The client apparatus of claim 5, wherein the searching unit further searches for a device which holds the application as a content item from among the devices which provide applications as the type of content by using a browse( ) or search( ) action.

7. The client apparatus of claim 5, wherein the control unit comprises:

an object generating unit which generates a service module as an object, which allows a local application installed in the client apparatus to control the application of the server, by using a UPnP service description for the UPnP service; and an action calling unit which calls a corresponding action of the UPnP service when a request for the application of the server from the local application through the service module is received.

8. The client apparatus of claim 5, wherein the server operates as an OpenCable-Digital Media Server (OC-DMS) and the client apparatus operates as an OpenCable-Digital Media Player (OC-DMP).

* * * * *